US009491595B2

(12) United States Patent
Tillet (10) Patent No.: US 9,491,595 B2
(45) Date of Patent: Nov. 8, 2016

(54) INSTANTIATING TALKGROUPS

(71) Applicant: IRIDIUM SATELLITE LLC, McLean, VA (US)

(72) Inventor: Daniel Tillet, McLean, VA (US)

(73) Assignee: IRIDIUM SATELLITE LLC, McLean, VA (US)

( * ) Notice: Subject to any disclaimer, the term of this patent is extended or adjusted under 35 U.S.C. 154(b) by 0 days.

(21) Appl. No.: 15/016,897

(22) Filed: Feb. 5, 2016

(65) Prior Publication Data

US 2016/0234660 A1 Aug. 11, 2016

Related U.S. Application Data (60) Provisional application No. 62/112,270, filed on Feb. 5, 2015.

(51) Int. Cl.
| | |
|---|---|
| *H04W 4/08* | (2009.01) |
| *H04W 4/10* | (2009.01) |
| *H04W 76/00* | (2009.01) |
| *H04B 7/185* | (2006.01) |

(52) U.S. Cl.
CPC ........... *H04W 4/08* (2013.01); *H04B 7/18513* (2013.01); *H04W 4/10* (2013.01); *H04W 76/005* (2013.01)

(58) Field of Classification Search
CPC ..... H04W 4/10; H04W 76/005; H04W 4/08; H04W 12/06; H04W 24/00; H04W 24/04; H04W 72/005; H04L 63/065; H04L 65/4061; H04L 12/1822; H04L 65/403; H04L 65/4038; H04L 63/1408; H04M 2203/2044; H04M 3/56; H04M 2203/5027
See application file for complete search history.

(56) References Cited

U.S. PATENT DOCUMENTS

| | | | | |
|---|---|---|---|---|
| 2002/0102999 | A1* | 8/2002 | Maggenti | H04L 12/1822 455/518 |
| 2003/0154249 | A1* | 8/2003 | Crockett | H04W 4/08 709/204 |
| 2006/0223562 | A1* | 10/2006 | Mathis | H04W 84/08 455/518 |
| 2007/0021052 | A1* | 1/2007 | Boice | H04W 4/18 455/3.01 |
| 2007/0105578 | A1* | 5/2007 | Shaffer | H04W 84/08 455/518 |
| 2013/0315164 | A1* | 11/2013 | Arur | H04W 76/002 370/329 |
| 2016/0183066 | A1* | 6/2016 | Chandler | H04W 4/10 455/518 |

\* cited by examiner

*Primary Examiner* — Sujatha Sharma
(74) *Attorney, Agent, or Firm* — Baker Botts L.L.P.

(57) ABSTRACT

In one implementation, information specifying a geographic area for a talkgroup may be received. In addition, information specifying that the talkgroup is a "warm" talkgroup may be received. In response to the receipt of the information specifying that the talkgroup is a "warm" talkgroup, a satellite constellation may be controlled to continuously light up a control channel in the geographic area for the talkgroup. A request to instantiate the talkgroup via the control channel may be received. In response thereto, the satellite constellation may be controlled to continuously light up a traffic channel in the geographic area for the talkgroup. Subsequently, the talkgroup may be determined to be inactive. In response thereto, the satellite constellation may be controlled to stop continuously lighting up the traffic channel in the geographic area while continuing to continuously light up the control channel in the geographic area.

20 Claims, 5 Drawing Sheets

INSTANTIATING TALKGROUPS

CROSS-REFERENCE TO RELATED APPLICATION

This application claims the benefit of U.S. Provisional Patent Application No. 62/112,270 filed on Feb. 5, 2015, the disclosure of which is incorporated herein by reference in its entirety.

TECHNICAL FIELD

The disclosure relates generally to Push-To-Talk ("PTT") communication, and more specifically to instantiating talkgroups in a PTT communication system.

SUMMARY

According to an implementation of the disclosure, a method may include receiving information specifying a geographic area for a talkgroup. The method may also include receiving information specifying that the talkgroup is a "warm" talkgroup. Further, the method may include controlling a satellite constellation to continuously light up one or more control channels in the geographic area in response to receiving the information specifying that the talkgroup is a "warm" talkgroup. The one or more control channels may be control channels for the talkgroup. In addition, the method may include receiving a request to instantiate the talkgroup via a control channel of the one or more control channels. Further still, the method may include controlling the satellite constellation to continuously light up one or more traffic channels in the geographic area in response to receiving the request to instantiate the talkgroup via the control channel. The one or more traffic channels may be traffic channels for the talkgroup. Subsequently, the method may include determining that the talkgroup is inactive. The method also may include controlling the satellite constellation to stop continuously lighting up the one or more traffic channels in the geographic area while continuing to continuously light up the one or more control channels in the geographic area in response to determining that the talkgroup is inactive.

Other features of the present disclosure will be apparent in view of the following detailed description of the disclosure and the accompanying drawings. Implementations described herein, including the above-described implementation, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

Various implementations set forth in this disclosure are described in relation to Push-To-Talk ("PTT") communication protocols implemented through a network of cross-linked satellites, but such implementations are not so limited and may be applied to many other communication protocols implemented through many other communication systems. In particular implementations set forth herein, satellite-based PTT communication may be implemented with one or more so-called "warm" talkgroups defined in particular geographic regions of the satellite-based PTT network that may be activated more quickly than other so-called "cold" talkgroups provided by the satellite-based PTT system. The definition of the so-called "warm" talkgroups and their corresponding geographic regions may be performed by a central administrator of the PTT network.

Particular implementations of satellite-based PTT networks may permit the coverage area for a talkgroup to be defined in advance by a talkgroup administrator. A talkgroup administrator may set out boundaries (e.g., using shapes) defining one or more regions of the Earth as the coverage area for the talkgroup within which devices that are provisioned to participate in the talkgroup will be able to access the talkgroup.

In certain satellite-based PTT implementations, a talkgroup may be defined as a "cold" talkgroup in which the network resources used in the instantiation of the talkgroup are called into use "from scratch" when a communication device provisioned to participate in the talkgroup requests to start a talkgroup session for the talkgroup. A relatively long period of time may elapse during this "from scratch" talkgroup establishment while the talkgroup is set up so that it is usable throughout the defined coverage area for the talkgroup. Customers, however, may desire to reduce this start-up latency, for example, due to their use models or to keep the differential between terrestrial land mobile radio ("LMR") network latencies and the satellite-based PTT network latencies more in line with each other.

Satellite-based PTT talkgroup sessions may be established by allocating static/bearer or traffic channels within the satellite beams that provide coverage of the defined coverage area for the talkgroup. In particular implementations, within each beam that provides coverage of the defined coverage area for a talkgroup, a control channel and a traffic channel (described in more detail below) may be active to enable communication devices provisioned to participate in the talkgroup to be able to participate in a talkgroup session, for example. For a so-called "cold talkgroup," when a communication device provisioned to participate in the talkgroup requests that a talkgroup session be initiated, control channels typically will be allocated within the beams that provide coverage of the defined coverage area for the talkgroup in response to the request to initiate the talkgroup session. These control channels then are used to signal the setup of the traffic channels that carry the actual communications of the talkgroup.

This process of setting up the control channels for the talkgroup may take about half of the nominal time required to fully instantiate the talkgroup (e.g., 1 second of a total 2 seconds of latency to initiate a talkgroup session). Particular implementations described herein may eliminate or significantly reduce the latency associated with setting up the control channels (e.g., 1 second) by implementing a so-called "warm" talkgroup for which the control channels may be maintained (e.g., permanently or for extended durations of time like days, weeks, or months) for the coverage area defined for the talkgroup. In this manner, when a talkgroup session is initiated for a "warm" talkgroup by a member device, the control channel already are established and only the traffic channels need be allocated anew for the talkgroup session. Consequently, the total latency required to instantiate the talkgroup may be reduced by about one half (e.g., 1 second).

In contrast to the "cold" talkgroups and "warm" talkgroups described above, other implementations of satellite-based PTT communications may utilize so-called "hot" talkgroups. In "hot" talkgroups, both the control channels and the traffic channels used for communication within the talkgroup may be maintained (e.g., permanently or for extended periods of time like days, weeks, or months), regardless of whether devices are using the talkgroup. These "hot" talkgroups may eliminate (or significantly reduce) the latency associated with instantiating "cold" talkgroups, but may use power and resources less efficiently, for example, by maintaining one or more unused traffic channels and preventing such traffic channels from being dynamically used for other purposes.

Certain satellite-based PTT implementations may provide a combination of "cold," "warm," and "hot" talkgroups. For example, in some implementations, an administrator may maintain a plurality of talkgroups. Some of the talkgroups may be "cold" talkgroups, some of the talkgroups may be "warm" talkgroups, and/or some of the talkgroups may be "hot" talkgroups. Talkgroups deemed to have relatively high importance may be defined as "warm" talkgroups and talkgroups deemed as having relatively lower importance may be defined as "cold" talkgroups. For example, a talkgroup designated for emergency communication may be defined as a "warm" talkgroup to enable more rapid communication and response.

As described above, "cold" talkgroups may implement a relatively efficient approach to resource utilization. When a device wishes to initiate a talkgroup session for a "cold" talkgroup, the device may request resources from the network to instantiate the talkgroup, and the network may instantiate the talkgroup according to a two-step process. First, control channels may be set up within the beams that cover the defined coverage area of the talkgroup. Second, the control channels may be used by the devices within the defined coverage area for the talkgroup to access the traffic channel(s) for the talkgroup within the one or more beams that cover the coverage area for the talkgroup. In such implementations, the "cold" talkgroups may be defined for a predefined and static geographic region (e.g., the entire geographic region is "lit up" when the talkgroup is instantiated). For example, the coverage area for such a "cold" talkgroup may be defined to include the continental United States and Europe. To initiate a talkgroup session for the talkgroup, a user in the continental United States may press a PTT button on a communication device provisioned to participate in the talkgroup or otherwise interact with the communication device to request the initiation of a talkgroup session. In response, the satellite-based PTT network may setup control channels in the beams that cover the continental United States and Europe as part of the talkgroup set up process. Communication devices within the defined coverage area and provisioned to participate in the talkgroup then may use the control channels to access traffic channels allocated for the talkgroup.

As noted above, particular satellite-based PTT implementations described herein may offer "warm" talkgroups. In some such systems providing "warm" talkgroups, at least one channel per beam covering the coverage area defined for the talkgroup may be allocated permanently (or for an extended period of time) as a control channel for a "warm" talkgroup, and that control channel may be active all of the time and available for use. Meanwhile, no traffic channels may be allocated for the talkgroup within the defined coverage area for the talkgroup until the control channel(s) signal that a talkgroup session has been initiated for the "warm" talkgroup. Consequently, instead of having to set up both the control channel(s) and the traffic channel(s) (which may result in relatively high latency but relatively efficient resource utilization) or actively maintain both the control channel(s) and the traffic channel(s) (which may result in relatively low latency but relatively inefficient resource utilization), "warm" talkgroups may present a middle ground between "cold" talkgroups and "hot" talkgroups that may reduce latency while still allowing for relatively efficient resource utilization. For example, the channels used as traffic channels for the "warm" talkgroup may be shared with other talkgroups when the "warm" talkgroup is not active.

In some satellite-based PTT systems, "warm" talkgroups may be defined for particular defined coverage areas (e.g., even if the satellites that provide coverage to the defined coverage areas change due to their orbits) such that control channel(s) corresponding to the talkgroups are continuously maintained (e.g., permanently or for extended periods of times like days, weeks, or months) throughout the coverage areas for the "warm" talkgroups. In a satellite-based PTT implementation in which a "warm" talkgroup is supported by a non-geostationary satellite constellation, for example, like a low-Earth orbit (LEO satellite constellation) the satellites may continuously move relative to the Earth such that coverage is provided to the coverage area by different satellites as the satellites orbit the Earth. Consequently, when an individual satellite moves into range to cover all or some portion of the coverage area defined for the talkgroup, the satellite may provide a control channel for the talkgroup within each of the satellite's beams that covers the coverage area for the talkgroup. The satellite may continuously maintain these control channels until the satellite moves out of range of the coverage area defined for the talkgroup. At that point, the satellite may deactivate the control channels while one or more other satellites move into place and provide the control channels for the talkgroup within the defined coverage area for the talkgroup.

In certain implementations, control channel(s) set up for a individual "warm" talkgroup may by unique to the "warm" talkgroup. For example, such control channel(s) may carry only information relevant to the "warm" talkgroup and may not carry information about other talkgroups and/or devices that are not provisioned to communicate in the "warm" talkgroup. Consequently, this may reduce the volume of information carried by the control channel(s) and may further reduce latency associated with the "warm" talkgroup.

As described above, an administrator may define the parameters of a "warm" talkgroup. For example, the administrator may define one or more of the geographic area covered by the "warm" talkgroup, the devices provisioned to use the "warm" talkgroup, which talkgroups are "warm" talkgroups, and triggering events that may cause the "warm" talkgroup to become a "cold" talkgroup or a "hot" talkgroup. Moreover, the administrator may dynamically change these defined parameters at any time. For example, the administrator may define a talkgroup on a seasonal basis, such that the talkgroup is "warm" at times of the year when the geographic area defined for the talkgroup is more-frequently utilized and "cold" at times of the year when the geographic area defined for the talkgroup is less-frequently utilized.

In some implementations, "warm" talkgroups may be defined for geographic areas with a relatively high density of devices and/or a high amount of talkgroup utilization (e.g., the continental United States) and "cold" talkgroups may be defined for geographic areas with a relatively low density of devices and/or a low amount of talkgroup utilization (e.g., over the Atlantic Ocean) or vice versa.

In certain implementations, a talkgroup may include combinations of "cold," "warm," and/or "hot" components. For example, the coverage area for a talkgroup may be defined to include a large geographic region or multiple non-contiguous geographic regions, and the talkgroup may be defined as a "cold" talkgroup in a first portion of the coverage area and a "warm" talkgroup in a second portion of the coverage area. In such an implementation, the control channel(s) covering the second portion of the coverage area may be maintained (e.g., permanently or for extended periods of time) when the talkgroup is inactive, but the control channel(s) covering the first portion of the coverage area may be torn down when the talkgroup is inactive. Accordingly, latency associated with instantiating the talkgroup may be higher for devices disposed in the first region than for devices disposed in the second region. Nevertheless, this may further reduce resource utilization associated with regions where latency is less of a concern.

Figure 1:
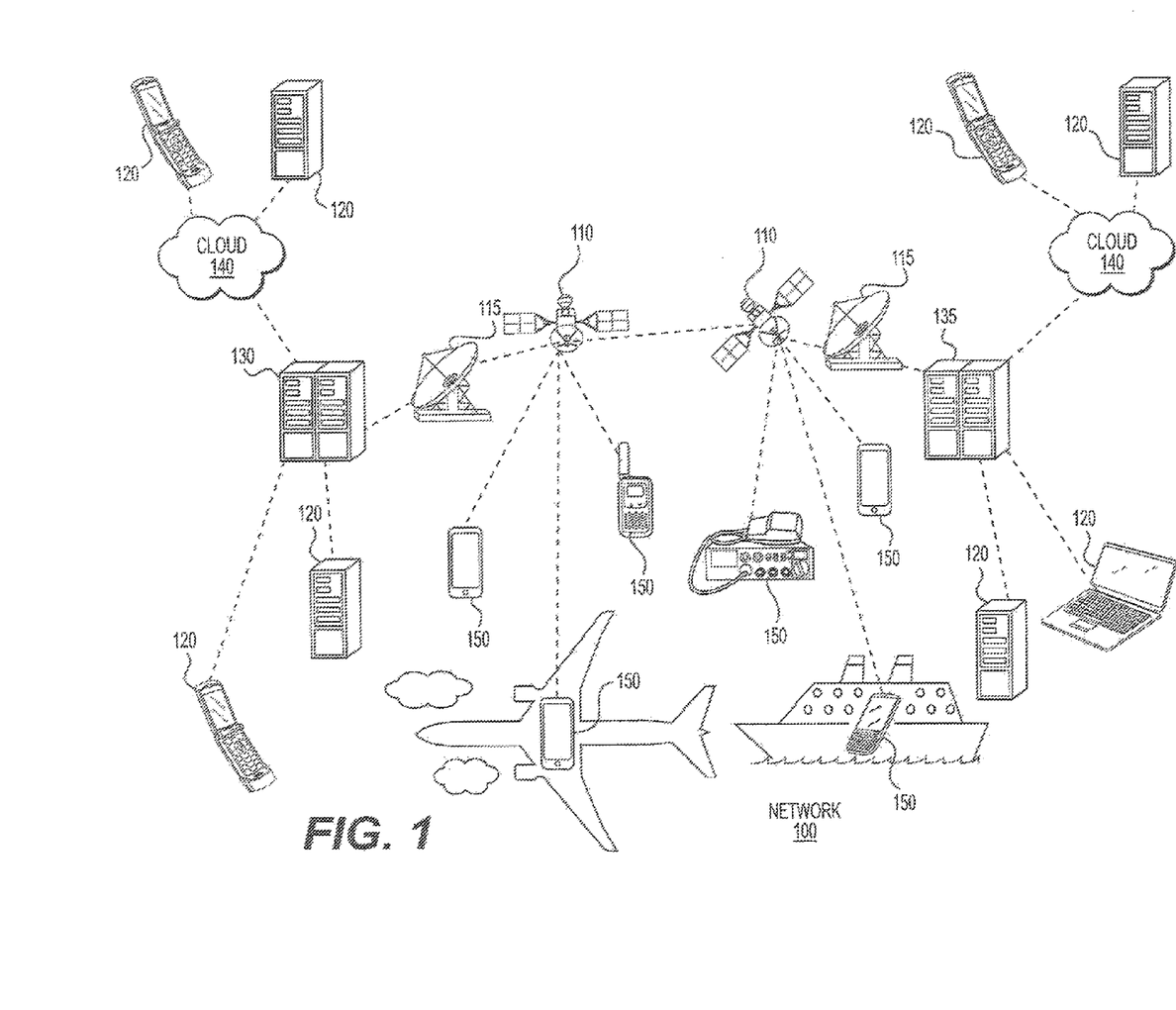
FIG. 1 is a block diagram of a network for satellite-based communications using one or more communication methods, in accordance with particular implementations of the present disclosure.

Referring now to FIG. 1, a network 100 may facilitate communication between communication devices using one or more communication methods. Specifically, FIG. 1 illustrates a block diagram of a network for satellite-based communication using one or more communication methods. Network 100 may comprise a plurality of satellites 110, each of which may permit the exchange of information and services among devices that are connected via satellites 110. Network 100 may also comprise a plurality of satellite links 115 (e.g., Earth-based satellite dishes, vehicle-based satellite dishes, high-power transmitters and receivers, antennas, Earth terminals, teleports) that may be configured to communicate with the one or more satellites 110 and relay data back and forth with the one or more satellites 110. In certain implementations, network 100 may comprise a plurality of cross-linked satellites 110 that effectively form a network between satellites 110 across which communications can be transferred. In other implementations, for example, network 100 may comprise one or more satellites 110 and each such satellite 110 may not directly connect to another satellite 110. In such other implementations, each satellite 110 may have a "bent pipe" architecture in which satellites 110 may only connect indirectly with one another through terrestrial-based systems, for example.

In addition, network 100 may comprise one or more management centers 130 (e.g., a Network Operations Center ("NOC") and/or a gateway for interfacing the satellite-based portion of network 100 to one or more terrestrial-based portions of network 100) configured to connect to at least one of the plurality of satellites 110. A management center 130 may comprise one or more locations (e.g., devices) that may monitor, control, or manage network 100. Each management center 130 may manage and monitor one or more satellites 110. For example, management center 130 may control movement or positioning of a satellite 110, may receive and monitor communications between a satellite 110 and other devices, or may determine when satellite 110 needs maintenance. In some implementations, a dedicated management center 130 may be established for each satellite 110. Alternatively, in some other implementations, a management center 130 may manage and monitor a plurality of satellites 110. In such implementations, management center 130 may connect directly with only one satellite 110 that is within range for direct communication with management center 130 via satellite link 115, or possibly a few satellites 110 that are within range of satellite link 115, and management center 130 may indirectly manage and control other satellites 110 in network 100 through cross-linked communications between the satellite (or satellites) 110 within range of satellite link 115 and satellites 110 outside of the range for direct communication with management center 130 via satellite link 115.

In some implementations, one or more satellites 110 may maintain a geostationary orbit, and management center 130 may always directly communicate, via satellite link 115, with the same satellite 110 that always remains in a geostationary position within range for direct communication with management center 130 via satellite link 115, for example. In other implementations, one or more satellites 110 may not maintain a geostationary orbit, and management center 130 may directly communicate with different satellites 110 at different times based on which satellite 110 or satellites 110 are within range for direct communication with management center 130 via satellite link 115 at any given time. Such satellites may be Low Earth Orbiting ("LEO") satellites, for example.

Management center 130 may be connected to one or more clouds 140, which may be public clouds, private clouds, or community clouds. Each cloud 140 may permit the exchange of information and services among devices (e.g., management center 130) that are connected to such clouds 140. In certain implementations, cloud 140 may be a wide area network, such as the Internet. In some implementations, cloud 140 may be a local area network, such as an intranet. Further, cloud 140 may be a closed, private network in certain implementations, and cloud 140 may be an open network in other implementations. Cloud 140 may facilitate the transmission of information among users or devices (e.g., management center 130, devices 120) that are connected to cloud 140 through any number of communication means, such as wireless transmission of information or wired transmission of information, for example. Management center 130 may integrate signals or data from satellites 110 with terrestrial systems, such as cellular networks, the public switched telephone network ("PSTN"), and/or the Internet via cloud 140, for example.

One or more devices 120 may connect with management center 130. Such devices 120 and management center 130 may transmit data therebetween. Devices 120 may include, for example, one or more general purpose computing devices, specialized computing devices, mainframe devices, wired devices, wireless devices, monitoring devices, infrastructure devices, other devices configured to provide information to service providers and users, telephones, mobile phones, computer devices, tablet computers, personal digital assistants, routers, switches, and any other suitable communication device. In certain implementations, for example, a device 120 connected with management center 130 may function as a management center and may mange a plurality of talkgroups (described in more detail below) assigned to a plurality of devices, such as communication devices 150 (described below in more detail), or organizations. In such implementations, the device 120 may establish, for example, connection orders for such talkgroups, priority settings for such talkgroups, home settings for such talkgroups, security settings or keys for such talkgroups, or other protocols for talkgroups.

Network 100 may include a plurality of gateways 135. Gateways 135 may function similarly to management center 130, except that gateways 135 may not have rights to control satellites 110 or responsibilities to manage satellites 110. In certain implementations, gateways 135 may communicate with satellites 110 via satellite links 115. In other implementations, gateways 135 may utilize other methods requiring less infrastructure, such as low power antennas, transmitters, or receivers, to communicate with satellites 110. For example, gateways 135 may serve as bridges between satellites 110, cloud 140, and devices 120 and may permit the free (or controlled) flow of data therebetween.

Network 100 may include a plurality of communication devices 150. Similar to devices 120, communication devices 150 may include, for example, one or more general purpose computing devices, specialized computing devices, mainframe devices, wired devices, wireless devices, monitoring devices, infrastructure devices, other devices configured to provide information to service providers and users, telephones, mobile phones, computer devices, tablet computers, personal digital assistants, routers, switches, and any other suitable communication device. Communication devices 150 may be configured to collect data from or provide data to one or more data sources (e.g., servers, networks, interfaces, other devices). For example communication devices 150 may collect information from network 100, management center 130, satellite link 115, satellites 110, and other devices connected to satellites 110, such as other communication devices 150. By collecting this information, communication devices 150 may perform one or more tasks associated with talkgroups, as discussed in more detail below, and other communication methods.

More particularly, communication devices 150 may establish direct communication with satellites 110 orbiting above their terrestrial positions. Accordingly, communication devices 150 may utilize satellites 110 to establish communication with other communication devices 150, with management center 130, with cloud 140, with devices 120, with gateway 135, and with any other suitable device or system. Communication devices 150 may include features similar to those of devices 120 and may similarly communicate with management centers 130 and gateways 135 in certain implementations.

Network 100 may be configured to facilitate PTT communication. PTT communication is a method of communicating that, in some implementations, may use half-duplex communication lines in which a communication device, such as a communication device 150, switches between a dedicated transmission mode and a dedicated reception mode, for example, for the purposes of communicating with one or more other communication devices that collectively may be referred to as a talkgroup. In some implementations of PTT communication, the communication device may be in the dedicated reception mode by default and may switch to the dedicated transmission mode only while a "talk" button is pushed or otherwise activated. In other implementations of PTT communication, the communication device may switch from the dedicated reception mode to the dedicated transmission mode in response to a first trigger, such as the selection of the dedicated transmission mode on the communication device, the detection of a particular sound (e.g., a user's voice, a particular word or command, a particular tone), or the receipt of any other instruction or command to switch to the dedicated transmission mode, and the communication device may remain in the dedicated transmission mode until a second trigger occurs and the communication device switches to the dedicated reception mode in response thereto. For example, the second trigger may include the selection of the dedicated reception mode on the communication device, the lapse of a particular period of time (e.g., 30 seconds, 1 minute, 5 minutes, 30 minutes, 1 hour) in the dedicated transmission mode, the absence of a particular sound (e.g., the user's voice), the detection of a particular sound (e.g., a particular word or command, a particular tone), or the receipt of any other instruction or command to end the dedicated transmission mode or to switch to the dedicated reception mode. In some instances, when a communication device is in the dedicated transmission mode, the device may be said to "have the floor" of the talkgroup.

Throughout this disclosure, PTT communications and communications more generally are described often in the context of voice communications. However, the systems and techniques described herein are not limited to communications involving voice. Rather, the systems and techniques described herein, and particularly the "warm" talkgroup functionality, are more generally applicable to all forms of communication, including data communication. In fact, in some implementations, the communication devices engaging in PTT communications may not be user devices such as handsets and the like, but instead may be machine-to-machine ("M2M") or other data communication devices that, for example, generally may be referred to as facilitating the "Internet of Things" ("IoT"). For instance, the communication devices may interface with sensors or other types of data processing and/or generating devices and may be configured to participate in PTT communication sessions, for example, involving one or more other communication devices, to share data. In such implementations, the communication devices still may exchange data with other communication devices within a talkgroup using PTT techniques, and the communication devices still may employ the "warm" talkgroup techniques described herein. Furthermore, while the term "PTT" or "push-to-talk" may suggest that something (e.g., a button) must be "pushed" (and, in some cases, held) in order for a communication device to "take the floor" or otherwise communicate in a dedicated transmission mode in a talkgroup, that is not necessarily the case. As described herein, there are various other mechanisms through which communication devices can "take the floor" or otherwise communicate in a dedicated transmission mode in a talkgroup, particularly in implementations where the communication devices are not user devices but instead are M2M or other data communication devices.

PTT communication may facilitate communication between a plurality of devices, such as communication devices 150, by establishing communication protocols that govern which communication device 150 "has the floor"

(e.g., is set to a dedicated transmission mode) and which communication device or devices 150 are listening (e.g., are set to the dedicated reception mode). Consequently, PTT communication may efficiently allocate communication roles (e.g., either being in a dedicated transmission mode or being in a dedicated reception mode) among a group of communication devices 150.

In some implementations of PTT communication, communication systems other than or in addition to half-duplex communication lines may be used. For example, some implementations of PTT communication may utilize two-way (or full) duplex communication lines in which a plurality of communication devices 150 may simultaneously be in transmission modes. In such alternative implementations, for example, users of a plurality of communication devices 150 may speak simultaneously and may all be heard by users of other communication devices 150 connected with the speaking users.

In PTT communication, communication may occur via one or more traffic channels. A traffic channel may correspond to an electromagnetic wave, such as a radio wave, of a particular frequency. A plurality of communication devices may connect to one or more traffic channel. In particular, a communication device set to the dedicated transmission mode and connected to a particular traffic channel may transmit a communication over the traffic channel, e.g., by transmitting an electromagnetic wave at the frequency corresponding to the traffic channel, to communication devices set to the dedicated reception mode or network nodes (e.g., a satellite 110) connected to the traffic channel. For example, a user may speak into a first communication device set to the dedicated transmission mode and connected to the traffic channel; the first communication device may encode the user's message in a radio signal and transmit the radio signal over the traffic channel (e.g., to a satellite); one or more second communication devices set to the dedicated reception mode and connected to the traffic channel may receive the radio signal (e.g., retransmitted by the satellite), including the encoded message, over the traffic channel; and the one or more second communication devices may output the user's message in the user's voice to the respective users of the one or more second communication devices. In this manner, a communication device set to the dedicated transmission mode and connected to the traffic channel may transmit a communication (e.g., a voice communication, Morse code, a data packet) simultaneously to all (or some subset of all) other communication devices set to the dedicated reception mode and connected to the traffic channel. As described below in more detail, PTT communication may utilize talkgroups, which function similar to the traffic channels described above but allow communication between communication devices set to a plurality of different traffic channels.

In some implementations of PTT communication, only one communication device per traffic channel may be set to the dedicated transmission mode at a time. Consequently, if a communication device connected to a traffic channel is set to the dedicated transmission mode, the other communication devices connected to the traffic channel may not switch to the dedicated transmission mode until the communication device set to the dedicated transmission mode is switched to the dedicated reception mode or otherwise deactivated, even if a first trigger for switching one of the other communication devices to the dedicated transmission mode occurs. For example, if pushing a particular button on a particular communication device is the first trigger for switching the particular communication device to the dedicated transmission mode, in such an implementation, pushing the particular button may not switch the particular communication device to the dedicated transmission mode until after the communication device currently set to the dedicated transmission mode is switched to the dedicated reception mode or otherwise deactivated. In some implementations, when a first trigger for switching one of the other communication devices to the dedicated transmission mode occurs, the first trigger may also serve as a second trigger for switching the communication device currently in the dedicated transmission mode to the dedicated reception mode, which may allow one of the other communication devices to switch to the dedicated transmission mode.

PTT communication also may utilize a control channel that may carry information about each of a plurality of traffic channels. The control channel may correspond to an electromagnetic wave, such as a radio wave, of a dedicated frequency. The control channel may provide a data stream including, for example, information about one or more of the available traffic channels or about the traffic channels in aggregate. Such information may include, for example, the number of available traffic channels and the frequencies of available traffic channels. Alternatively or additionally, the data stream may include information about communication devices associated with the one or more available traffic channels including, for example, the number of communication devices connected to or waiting for each traffic channel, the types of communication devices connected to or waiting for each traffic channel, the length of time one or more communication devices have been connected to each traffic channel, whether a communication device connected to a particular traffic channel is set to the dedicated transmission mode, which communication device is currently set in a dedicated transmission mode on a particular traffic channel, the length of time a communication device has been set in a dedicated transmission mode on a particular traffic channel, the length of time a particular traffic channel has been active (e.g., an aggregate length of time that one or more communication devices have been set in a dedicated transmission mode on a particular traffic channel), which communication device is currently set in a dedicated reception mode on a particular traffic channel, whether each traffic channel is available, and other information about the communication devices connected to the traffic channels.

In implementations of PTT communication utilizing talkgroups, the control channel data stream may include information including, for example, information identifying whether a traffic channel is assigned to a talkgroup, information identifying traffic channels assigned to particular talkgroups, and other information about the traffic channels and any talkgroups to which traffic channels are assigned. Such information may allow communication devices to connect with or remain connected to talkgroups as the frequencies or traffic channels associated with the talkgroups are reallocated and as the communication devices move relative to satellites 110 (or as satellites 110 move relative to the communication devices) and the respective beams thereof, which may, for example, result in handoffs being made between beams, satellites, etc.

As described below in more detail, talkgroups may be characterized as either active talkgroups (sometimes referred to as "live" talkgroups) or inactive talkgroups (sometimes referred to as "dead" talkgroups). For example, active talkgroups may be talkgroups on which active communication is currently occurring (e.g., a user is currently speaking into a communication device connected to a talkgroup and the communication device is transmitting the spoken audio in a dedicated transmission mode) or on which active communication has occurred within a particular period of time. Similarly, inactive talkgroups may be talkgroups on which active communication is not currently occurring (e.g., no communication devices are connected to the talkgroup and transmitting in a dedicated transmission mode) or on which active communication has not occurred within a particular period of time.

In some instances, a talkgroup may be determined to be active even if active communication (e.g., speaking, data transmission) is not currently occurring (or has not occurred within the particular period of time) within the talkgroup. For example, communication devices may determine whether a talkgroup is active or inactive based on information from the control channel indicating whether one or more traffic channels are currently allocated to the talkgroup (or have been allocated to the talkgroup) within the particular period of time, rather than determining whether active communication is actually occurring (or has occurred within the particular period of time). For example, if control channel 0 provides information indicating that traffic channel 1 is currently allocated to talkgroup A or has been allocated to talkgroup A within a particular period of time (e.g., within the last 10 seconds), then a communication device 150 listening to control channel 0 may determine that talkgroup A is an active talkgroup. Alternatively, if control channel 0 provides information indicating that no traffic channels are currently allocated to talkgroup A or that no traffic channels have been allocated to talkgroup A within the particular period of time, then a communication device 150 listening to control channel 0 may determine that talkgroup A is an inactive talkgroup.

In some implementations, traffic channels may be allocated to a talkgroup in response to a request from a communication device provisioned to participate in the talkgroup. For example, if the talkgroup is inactive, no traffic channels may be currently allocated to the talkgroup. In response to a communication device that is provisioned to participate in the talkgroup requesting to participate in the dedicated transmission mode, one or more traffic channels may be allocated to the talkgroup to enable communications over the talkgroup. Thereafter, traffic channel(s) may be maintained for the talkgroup until no devices provisioned to participate in the talkgroup have participated in the talkgroup in the dedicated transmission mode for more than some defined threshold period of time. After the defined threshold period of time elapses with no device provisioned to participate in the talkgroup having participated in the talkgroup in the dedicated transmission mode, the traffic channel(s) allocated to the talkgroup may be torn down and the talkgroup may transition back to an inactive status.

In some implementations, data transmitted in the control channel may explicitly define whether a talkgroup is active or inactive. For example, in some implementations, a centralized entity (e.g., management center 130) may determine whether a talkgroup is active or inactive (e.g., based on whether active communication is occurring or has occurred within a defined period of time within the talkgroup) and transmit an indication of whether the talkgroup is active or inactive within the control channel.

A plurality of talkgroups may be available to particular communication devices or users. For example, available talkgroups for particular communication devices or users may be provisioned by management center 130, gateway 135, or a device 120 based on the communication devices' or users' affiliation with an organization. As an example, one set of available talkgroups may be provisioned for users or devices affiliated with a particular branch or division of the U.S. military, while another set of available talkgroups may be provisioned for a petroleum prospecting company, and still another set of available talkgroups may be provisioned for employees or aircraft of an airline. Each set of available talkgroups may include a plurality of talkgroups that may only be accessible (e.g., available) to devices or users associated with the organization to which the respective set of available talkgroups was provisioned. Such available talkgroups may, however, utilize the same beams and/or traffic channels, but utilization of the beams and/or traffic channels may be dynamically allocated such that each individual set of available talkgroups remains accessible only to devices or users associated with the organization to which the talkgroups were provisioned. Further, in some implementations, each set of available talkgroups may be affiliated with one or more control channels that carry information about such available talkgroups. In other implementations, certain talkgroups may only be available using a particular access code, for example.

A plurality of communication devices may connect to a control channel, and the data transmitted in the control channel may enable each communication device of the plurality of communication devices (or each user thereof) to select a traffic channel to which such communication device may connect and to determine whether such communication device may be switched to the dedicated transmission mode at a particular instant in time. In some implementations, the control channel may even provide commands or assignments for particular communication devices to connect with particular traffic channels. Further, the control channel or a similar channel may be used for establishing a connection between a first set of one or more communication devices and a second set of one or more communication devices through the Internet or another data network.

In some implementations, communication devices may continuously monitor the control channel. In other implementations, communication devices may selectively or periodically access the control channel, such as when a setting is changed or requested to be changed in the communication device (e.g., changing or requesting to change between a dedicated transmission mode and a dedicated reception mode, changing or requesting to change between talk groups), when the communication device is activated or removed from a sleep or hibernation state, or at predetermined or specified intervals of time. In some implementations, the data in the control channel may be continuously transmitted (e.g., broadcast) to the connected communication devices. In other implementations, the data in the control channel may be periodically or intermittently transmitted (e.g., broadcast) to the connected communication devices. Additionally or alternatively, the data in the control channel may be transmitted (e.g., broadcast) to the connected communication devices in response to the occurrence of or when certain events occur, such as a new communication device connecting to the control channel or when a communication device is activated or switches between the reception mode and the transmission mode, for example.

In satellite-based implementations of PTT communication systems, satellite 110 may generate one or more beams or spot beams that enable the satellite to transmit and/or receive one or more different data signals within each beam. Such beam(s) may create a footprint spanning a particular geographic region of the Earth. The footprint may be based on the characteristics of a satellite 110's antenna, such as the antenna's gain pattern, transmission power, transmit and/or receive frequencies, and the efficiency or quality of the antenna, for example. In some implementations, the radius of the particular geographic region within the footprint of a particular beam may be about 400 km. In other implementations, the radius of the particular region may be substantially less than or greater than 400 km based on factors such as the transmission power associated with the particular beam and sources of interference (e.g., mountains, trees, buildings, electromagnetic radiation sources). In some implementations, each satellite 110 may provide a plurality of beams, and each such beam may be directed to a different geographic region. Certain satellites 110 may move relative to the Earth over time, such that the geographic regions within the footprints of the satellites' 110 beams also change over time. Other satellites 110 may be geostationary, and the geographic regions within the footprints of the satellites' 110 beams may remain fixed in time or at least fixed for periods of time. Moreover, some satellites 110 may be configured to direct one or more beams to cover different geographic regions or to change power characteristics, such that the size of the geographic regions within the footprint(s) of the beam(s) may change.

Each beam may include a plurality of carriers (e.g., channels, frequencies), for example. In some implementations, frequencies may be assigned within the full spectrum of the beam, and such frequencies may be shared by communication devices within the footprint of the beam. In other implementations, frequencies may be assigned within only a portion of the full spectrum of the beam. Each beam may include one or more control channels (e.g., control channel 0) and a plurality of traffic channels (e.g., traffic channels 1, 2, 3, and 4). Accordingly, the one or more control channels and the plurality of traffic channels included in a particular beam may be available to the communication devices within the footprint of the particular beam. In some instances, however, interference sources may prevent some communication devices within the footprint of the particular beam from accessing the one or more control channels and/or the plurality of traffic channels in the particular beam.

In some implementations, beams from different satellites may create footprints that overlap with one another. In such cases, each communication device in such an overlapping region may only receive information from one control channel at a time. Consequently, the communication devices may be configured to select between the control channels associated with overlapping beams based on certain criteria. Such criteria may include, for example, one or more of the relative strength of the signal received from each beam (e.g., there may be a preference to select the control channel corresponding to the beam with a higher strength), whether the strength of the control channel currently being monitored is less than or equal to a particular signal level (e.g., there may be a preference to stay connected with the current beam until the signal strength of the beam becomes too low), and a determination of whether the communication device is currently communicating with other communication devices within the footprint of one of the beams (e.g., there may be a preference to stay connected with the current beam to maintain uninterrupted communication with the other communication devices).

In particular implementations, talkgroups may be associated with particular coverage areas. For example, a talkgroup provisioned to a city fire department may be available only in a coverage area that is coterminous with the city's boundaries. In another example, a particular talkgroup may only be available in a geographic area covered by a particular beam from a particular satellite. In these particular implementations, for example, communication devices may only participate in a particular talkgroup when such communication devices are within the coverage area of the particular talkgroup.

Figure 2:
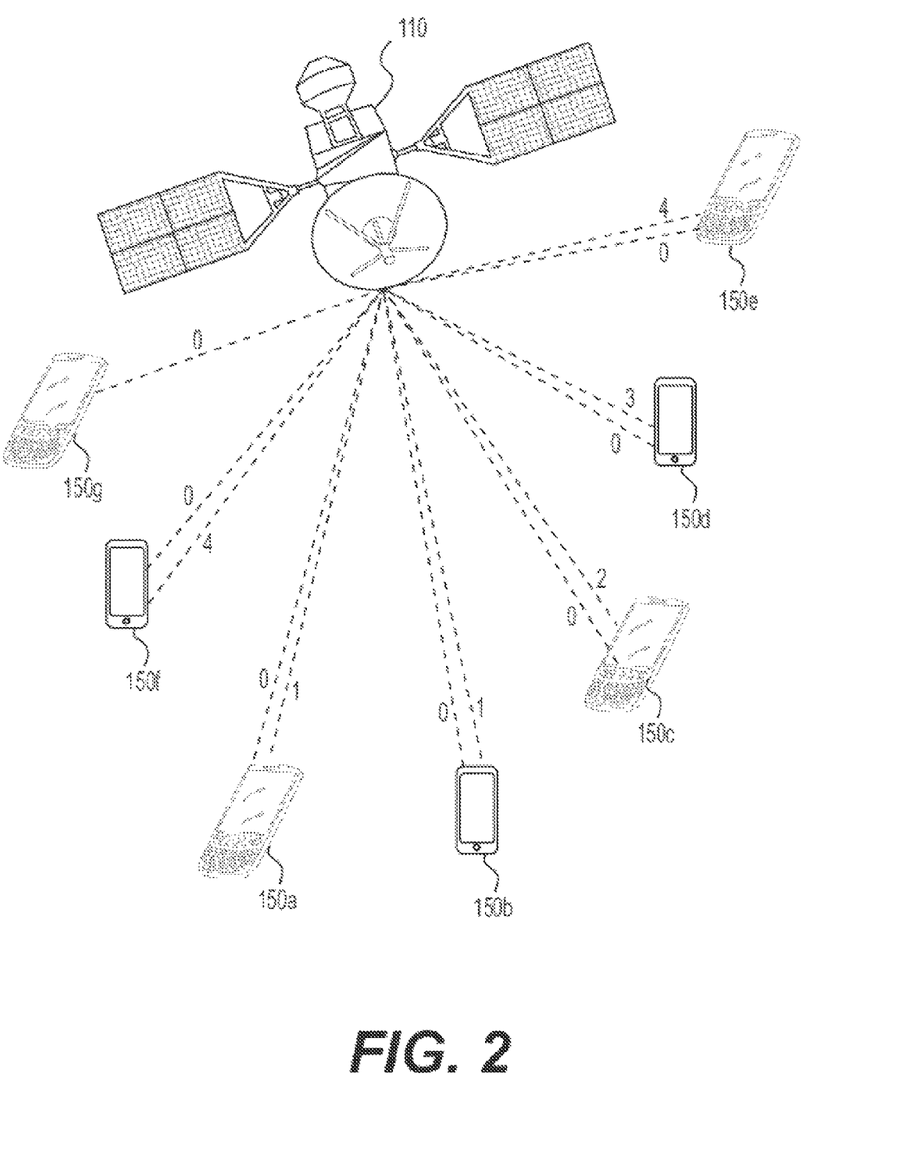
FIG. 2 is a schematic diagram illustrating a satellite-based implementation of a push-to-talk system, in accordance with particular implementations of the present disclosure.

FIG. 2 shows a schematic of one example of a satellite-based implementation of a PTT system. As shown in FIG. 2, each of communication devices 150 may monitor control channel 0. Some communication devices 150, such as communication devices 150*a* and 150*b*, may be set to transmit or receive communications via traffic channel 1. Other communication devices 150, such as communication device 150*c*, may be set to transmit or receive communications via traffic channel 2. Still other communication devices 150, such as communication device 150*d*, may be set to transmit or receive communications via traffic channel 3. Additional communication devices 150, such as communication devices 150*e* and 150*f*, may be set to transmit or receive communications via traffic channel 4. Certain communication devices 150, such as communication device 150*g*, may not be set to transmit or receive communications via any of traffic channels 1-4. Furthermore, the settings of communication devices 150*a*-*g* may be changed, such that one or more of communication devices 150*a*-*g* may be reset to transmit or receive communications via different ones of traffic channels 1-4 than those shown in FIG. 2.

PTT communication systems, such as network 100, may utilize a trunked radio system including a plurality of talkgroups. The trunking function may be implemented by a device 120 or by management center 130, for example. In some implementations, a talkgroup may be implemented generally using a communication channel within a trunked radio system that may function the same as or similarly to a traffic channel as described above; however, in some implementations, unlike a traffic channel assigned to a particular radio frequency, a particular talkgroup may utilize different radio frequencies at different times. A trunked radio system may include a control channel and a limited number of traffic channels. Communication devices using the trunked radio system may monitor the control channel to determine available traffic channels (e.g., traffic channels without current communication activity such as connected devices or active communication transmissions from devices set in a dedicated transmission mode). When a communication device is set to a particular talkgroup, the communication device may either assign an available traffic channel to the particular talkgroup or identify a traffic channel currently assigned to the particular talkgroup. Thereafter, the communication device may begin transmitting or listening on the traffic channel assigned to the talkgroup set on the communication device.

Referring to FIG. 2, communication devices 150*a* and 150*b* may both be participating in the same talkgroup, for example. Moreover, each of communication devices 150*a*-150*g* may be provisioned to participate in a plurality of talkgroups, such that communication devices 150*a*-150*g* may switch back and forth between talkgroups. For example, communication device 150*a* may be provisioned to participate in a talkgroup currently active on traffic channel 4 and, consequently, may switch into that talkgroup to communicate with communication devices 150*e* and 150*f*.

Figure 3:
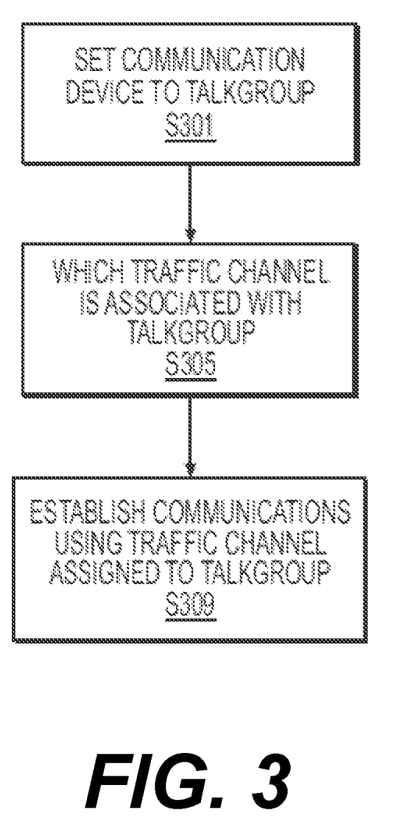
FIG. 3 is a flow chart illustrating a method for establishing communication via one or more talkgroups, in accordance with particular implementations of the present disclosure.

An example of a process of establishing communication via a talkgroup is shown in FIG. 3. In S301, a communication device may be set to a particular talkgroup, such as a talkgroup A, for example. Thereafter, in S305 the communication device may determine which traffic channel to use to connect the communication device to talkgroup A. For example, the communication device may analyze the information from a control channel, such as control channel 0, to determine if a traffic channel already has been assigned to talkgroup A (e.g., because other devices are currently connected to talkgroup A or communicating in talkgroup A). If a traffic channel already has been assigned to talkgroup A, the communication device may use the information from control channel 0 to determine which traffic channel is currently associated with talkgroup A.

If a traffic channel has not already been assigned to talkgroup A, for example, because talkgroup A is not currently instantiated, the communication device may request that talkgroup A be instantiated and/or that a traffic channel be assigned to talkgroup A. In such a scenario (e.g., in the case of a "cold" talkgroup), there may not be an existing control channel allocated to provide information about talkgroup A. Therefore, in response to the request from the communication device, one or more control channels as well as one or more traffic channels for the talkgroup may be allocated within the beam(s) providing coverage of the coverage area for the talkgroup, and information about the assigned traffic channel(s) for talkgroup A may be provided via the control channel(s). Alternatively, if an existing control channel has been allocated to provide information about talkgroup A even though talkgroup A is not currently instantiated (e.g., in the case of a "warm" talkgroup), the communication device may transmit the request via the control channel or another channel and information about the traffic channel(s) allocated for talkgroup A may be transmitted to the communication device within the control channel.

After determining which traffic channel is associated with talkgroup A in S305, the communication device may connect to the assigned traffic channel in S309 and may begin transmitting or listening within talkgroup A.

Management center 130, gateway 135, or a device 120 may be responsible for associating a particular traffic channel with talkgroup A and transmitting this information out through control channel 0 to be received by communication devices 150, for example. Consequently, this information may be added to the control channel and the control channel may include information identifying the particular traffic channel assigned to talkgroup A. This information may be used by other communication devices when such communication devices perform S305 after being set to talkgroup A in S301.

Communication devices may disconnect from a talkgroup by switching to another talkgroup, entering a sleep or hibernation mode, or being deactivated, for example. Accordingly, once all of the devices previously connected to a particular talkgroup disconnect from the particular talkgroup or when no communication is currently being performed via the particular talkgroup (e.g., there are no devices transmitting in a dedicated transmission mode via the particular talkgroup or no devices have transmitted in a dedicated transmission mode via the particular talkgroup for a defined period of time), the traffic channel assigned to the particular talkgroup may become available for use by other talkgroups or for other communication methods. In some implementations, there may be a predetermined or selectable delay period between the time when all of the devices have disconnected from the talkgroup or the time when communication via the talkgroup has terminated and the time when the traffic channel assigned to the particular talkgroup becomes available for use by other talkgroups (e.g., 1 second, 5 seconds, 1 minute, 5 minutes). When a delay period exists, control channel 0 may also wait for the delay period before providing information that the traffic channel previously assigned to the particular talkgroup is available and that the particular talkgroup currently is not established.

In the manner described above, traffic channels may be dynamically allocated among talkgroups to efficiently reduce instances in which traffic channels are unused and to reduce the duration of such disuse. Further, certain users of network 100 may desire more secure communications. By giving these users access to particular talkgroups that frequently cycle through different traffic channels, these users may be able to communicate more securely than would otherwise be possible over a static traffic channel.

Figure 4:
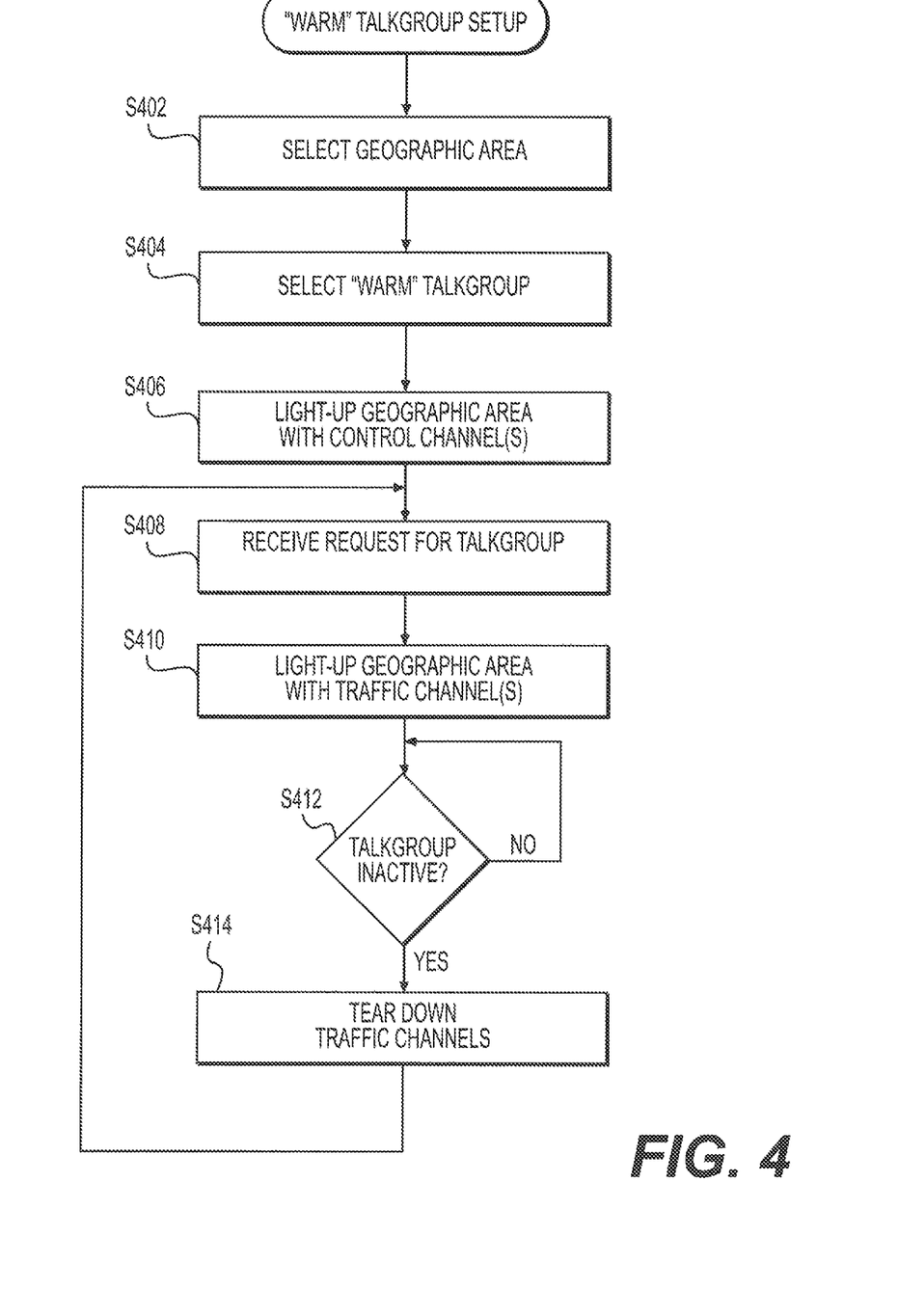
FIG. 4 is a flow chart illustrating a method of maintaining a "warm" talkgroup in a push-to-talk system, in accordance with particular implementations of the present disclosure.

Particular implementations of a satellite-based PTT communication system offering a "warm" talkgroup feature now are disclosed in more detail with respect to FIG. 4.

FIG. 4 is a flow chart illustrating a method of providing a "warm" talkgroup in a satellite-based PTT system, in accordance with particular implementations of the present disclosure.

In particular implementations, the method of providing a "warm" talkgroup in a satellite-based PTT system may be implemented within network 100 where it is desirable to reduce the latency associated with instantiating a particular talkgroup for communication between a plurality of communication devices. Such communications may be, for example, emergency broadcasts, warnings, transmissions of critical data or software, monitored parameters, or any other information that may be desirable to communicate to the particular group of devices rapidly.

In S402, one or more geographic areas are selected as the coverage area for a talkgroup, for example, by an administrator at a management center 130 (e.g., an operations hub). One or more communication devices 150 may be provisioned to communicate on network 100 using the talkgroup, for example. The administrator may, for example, use a device 120 connected to management center 130 to select the geographic area(s). Each device provisioned to participate within the particular talkgroup may access the talkgroup when such device is disposed within the particular geographic area defined in S402.

In S404, the administrator may define the particular talkgroup as a "warm" talkgroup. For example, the administrator may determine that there is a need for reduced latency associated with instantiation of the particular talkgroup and, as a result, may determine that the particular talkgroup should be maintained as a "warm" talkgroup. In certain implementations, S404 may be performed prior to S402, for example, such that the particular talkgroup is defined as a "warm" talkgroup prior to defining the geographic area covered by the talkgroup.

In S406, device 120 may inform satellites 110, via network 100, of the coverage area for the particular talkgroup and that the particular talkgroup has been defined as a "warm" talkgroup. At this point, the satellite(s) 110 that is/are currently providing beams covering the coverage area may establish control channel(s) for the particular talkgroup, such that the control channel(s) for the talkgroup are active throughout the entire coverage area defined for the particular talkgroup, for example, even without a communication device provisioned to participate in the talkgroup having requested the instantiation of the talkgroup. In certain implementations, the satellite(s) 110 may accomplish this by setting up a control channel within each beam providing coverage of the defined coverage area for the talkgroup. In some implementations, such control channel(s) may be unique to the "warm" talkgroup and may not be used by other talkgroups. In other implementations, such control channel(s) may support a plurality of talkgroups.

If the satellite-based PTT system is implemented using a non-geostationary satellite constellation (e.g., a LEO satellite constellation), as the satellite(s) 110 move away from and stop providing coverage for the defined geographic area, those satellite(s) 110 may handoff the control channel(s) to other satellite(s) 110 as they begin to cover the defined coverage area for the talkgroup. Such other satellites may begin to provide the control channel(s) when they start providing coverage for the defined coverage area for the talkgroup. In this manner, the satellites 110 may share responsibility for maintaining continuously available control channels for the "warm" talkgroup in the defined coverage area for the talkgroup.

In S408, a communication device 150 may make a request to instantiate the "warm" talkgroup. In particular implementations, a communication device 150 provisioned to participate in the talkgroup and disposed in the defined coverage area may access the control channel for the "warm" talkgroup of the beam currently covering the communication device 150 and use the control channel to transmit a request to instantiate the "warm" talkgroup to the satellite 110 providing the control channel. In alternative implementations, the communication device 150 may transmit the request to instantiate the talkgroup to the satellite 110 using a different channel than the control channel.

In S410, the request to instantiate the "warm" talkgroup may be passed to the management center 130, and device 120 may control the satellite(s) 110 currently providing coverage of the defined coverage area for the talkgroup to allocate traffic channel(s) for the "warm" talkgroup within the beams that are covering the defined coverage area for the talkgroup. In some implementations, the satellite 110 that receives the request to instantiate the "warm" talkgroup (and other satellite(s) 110 currently providing coverage of the defined coverage area for the talkgroup) may allocate one or more additional channels to use as traffic channels for the "warm" talkgroup based on the request without passing the request to management center 130. In addition, such satellite(s), with or without instruction from management 130, may transmit signaling information in the control channel(s) for the talkgroup identifying the traffic channel(s) that have been allocated for the talkgroup so that the communication devices 150 provisioned to participate in the talkgroup know which traffic channel(s) to access to participate in the talkgroup. Further, as satellite(s) 110 orbit they may handoff responsibility for providing the traffic channels for the talkgroup in a manner similar to that described above for S406 with respect to the control channel(s).

In S412, device 120 at the management center 130 may determine whether the particular talkgroup has become inactive (e.g., whether communication is no longer taking place via the particular talkgroup). In certain implementations, one or more of the satellites 110 or the management center 130 itself may make the determination of S412 instead of device 120. If the particular talkgroup is still active (S412: No), the determination of S412 may be repeated periodically until the particular talkgroup becomes inactive. Alternatively, if the particular talkgroup has become inactive (S412: Yes), the process may proceed to S414.

In S414, device 120 may instruct the satellite(s) 110 providing the traffic channels for the particular talkgroup to tear down (e.g., reallocate or terminate) the traffic channels for the particular talkgroup. Consequently, the satellite(s) 110 may tear down the traffic channels for the particular talkgroup. Nevertheless, because the particular talkgroup was defined as a "warm" talkgroup by the administrators, the satellite(s) 110 may not tear down the control channel(s) for the particular talkgroup. Thus, control channel(s) for the talkgroup may be maintained continuously throughout the coverage area defined for the talkgroup even though the talkgroup no longer is active. The process then may return to S408 and wait for another request to instantiate the particular (e.g. "warm") talkgroup.

As described above, talkgroups may be used to transfer voice communications or data communications. In some implementations, talkgroups may function as a broadcast mechanism for transmitting packets of information. In some implementations, the packets of information may include sound data that may be used to implement voice communication. In other implementations, the packets of information may include data representing other media, such as text, software, videos, and webpages, for example. In still other implementations, some talkgroups may carry packets of information including sound data and other talkgroups may carry packets of information including data representing other media, or talkgroups may be dynamically reallocated to carry these different types of data packets as needed. In some implementations, the PTT administrator may dynamically reallocate talkgroups between voice communication and data communication at the management center. In other implementations, users of communication devices may dynamically reallocate talkgroups between voice communication and data communication at the communication devices themselves.

For example, a particular talkgroup may be responsible for transmitting critical information or software to communication devices in a PTT network. In certain implementations, this talkgroup may be assigned as a "warm" talkgroup, such that startup latency associated with instantiating the talkgroup will be reduced and the critical information or software will be pushed out quickly.

For example, an oil pipeline may include different monitoring devices and valves may be spread along the pipeline, each containing communication devices provisioned to utilize a particular talkgroup. If a valve malfunctions, it may be critical that the associated monitoring device warns the pipeline operator and/or the other valves, such that the other valves can take appropriate actions to prevent the malfunction from cascading. By using a "warm" talkgroup, the talkgroup may be instantiated more rapidly, for example, than in the case of a "cold" talkgroup, and the pipeline operator and other valves may receive the warning sooner and have more time to prevent the malfunction from cascading.

Another example implementation of "warm" talkgroups may involve military applications. For example, a military user of a satellite-based PTT network may need to rapidly communicate information about a hostile engagement, but continuously-maintained "hot" talkgroups may not be feasible for security reasons or may be too resource intensive. Consequently, a "warm" talkgroup may be utilized to reduce latency and avoid security issues or resource inefficiency related to a continuously-maintained "hot" talkgroup.

Figure 5A:
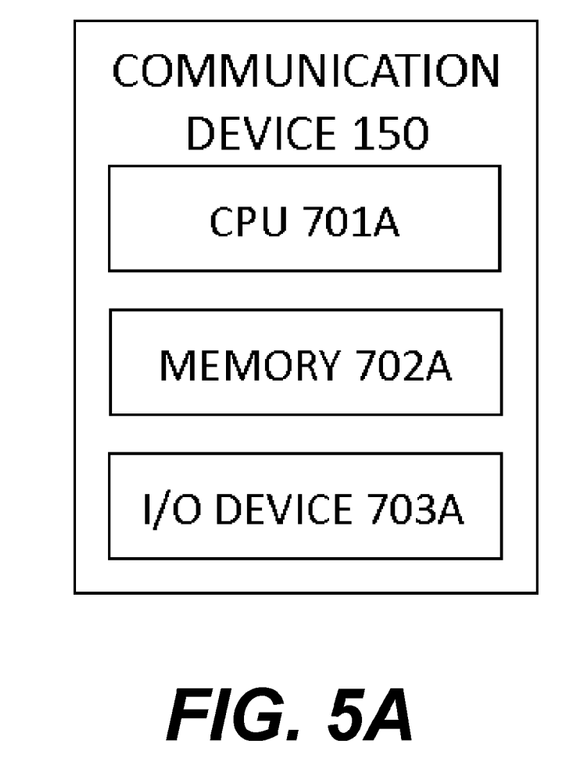
FIG. 5A is a schematic diagram of a communication device configured to participate in a satellite communication system, including, for example, a satellite-based PTT system, in accordance with particular implementations of the present disclosure.

FIG. 5A shows a schematic diagram of a mobile communication device configured to participate in a satellite communication system, including, for example, a satellite-based PTT system, in accordance with particular implementations of the present disclosure.

Communication device 150 may include a central processing unit ("CPU") 701A, a memory 702A, and an input/output ("I/O") device 703A.

Memory 702A may store computer-readable instructions that may instruct CPU 701A to perform certain processes.

Memory 702A may comprise, for example, RAM, ROM, EPROM, Flash memory, a hard disk drive, a solid state drive, or any suitable combination thereof. When executed by CPU 701A, the computer-readable instructions stored in memory 702A may instruct CPU 701A to operate as one or more devices configured to perform particular functions. In certain implementations, memory 702A may store computer-readable instructions for performing any and all functions or processes described herein, and CPU 701A may execute such computer-readable instructions and operate as one or more devices configured to perform or control such functions or processes. Memory 702A may store data, such as position information, information about provisioned talkgroups, or connection information associated with network 100, for example.

CPU 701A may execute the computer-readable instructions stored in memory 702A, and the computer-readable instructions may instruct CPU 701A to perform or control a plurality of processes including, but not limited to, one or more of the processes described with respect to FIGS. 3 and 4 and any other process described herein. Accordingly, CPU 701A may be configured to perform a variety of processes, as discussed above in more detail. For example, CPU 701A may be a processor, a controller, an application specific integrated circuit ("ASIC"), or a system comprising a plurality of processors, controllers, or ASICs.

I/O device 703A may receive one or more of data from network 100, data from one or more other devices connected to communication device 150, and input from a user and provide such information to CPU 701A and/or memory 702A. I/O device 703A may transmit data to network 100, may transmit data to one or more other devices connected to communication device 150, and may transmit information to a user (e.g., display the information or indicators thereof, provide audible indications of such information). I/O device 703A may include, for example, one or more of a transceiver, a modem, a network card, a transmitter, a receiver, a microphone, a speaker, an antenna, a light-emitting diode ("LED"), a display device, or any other device configured to provide or receive information.

Figure 5B:
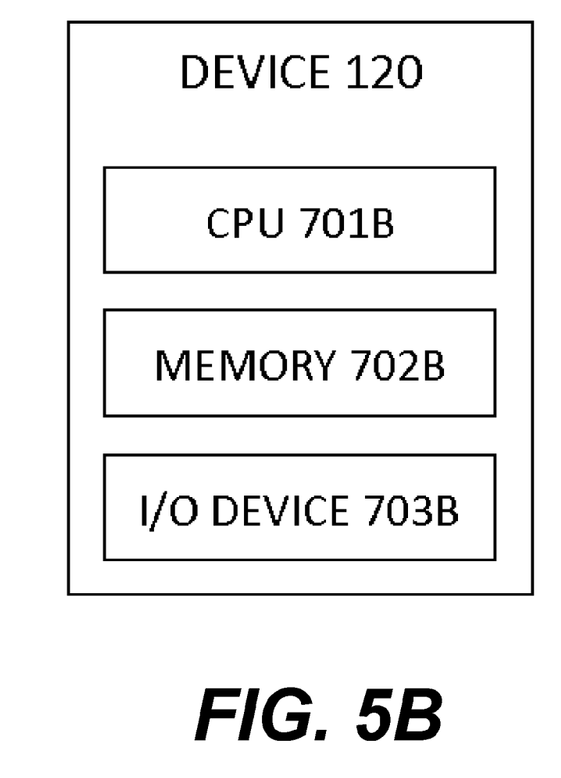
FIG. 5B is a schematic illustration of a device configured to implement one or processes for managing communication in a satellite communication system, including, for example, a satellite-based PTT system, in accordance with particular implementations of the present disclosure.

FIG. 5B shows a schematic illustration of a device 120 configured to implement one or processes for managing communication in a satellite communication system, including, for example, a satellite-based PTT system, in accordance with particular implementations of the present disclosure. Device 120 may include a CPU 701B, a memory 702B, and an I/O device 703B. In some implementations, CPU 701B, a memory 702B, and an I/O device 703B may function similarly to CPU 701A, a memory 702A, and an I/O device 703A. In other implementations, CPU 701B, a memory 702B, and an I/O device 703B may have functionalities different from CPU 701A, a memory 702A, and an I/O device 703A.

Memory 702B may store computer-readable instructions that may instruct CPU 701B to perform certain processes. Memory 702B may comprise, for example, RAM, ROM, EPROM, Flash memory, a hard disk drive, a solid state drive, or any suitable combination thereof. When executed by CPU 701B, the computer-readable instructions stored in memory 702B may instruct CPU 701B to operate as one or more devices configured to perform particular functions. In certain implementations, memory 702B may store computer-readable instructions for performing any and all functions or processes described herein, and CPU 701B may execute such computer-readable instructions and operate as one or more devices configured to perform or control such functions or processes. Memory 702B may store data, such as position information, information about provisioned talkgroups, information about communication devices 150, or operational information associated with network 100, for example.

CPU 701B may execute the computer-readable instructions stored in memory 702B, and the computer-readable instructions may instruct CPU 701B to perform or control a plurality of processes including, but not limited to, one or more of the processes described with respect to FIGS. 3 and 4 and any other process described herein. Accordingly, CPU 701B may be configured to perform a variety of processes, as discussed above in more detail. For example, CPU 701B may be a processor, a controller, an ASIC, or a system comprising a plurality of processors, controllers, or ASICs.

I/O device 703B may receive one or more of data from network 100, data from one or more other devices connected to communication device 120, and input from a user and provide such information to CPU 701B and/or memory 702B. I/O device 703B may transmit data to network 100, may transmit data to one or more other devices connected to communication device 120, and may transmit information to a user (e.g., display the information or indicators thereof, provide audible indications of such information). I/O device 703B may include, for example, one or more of a transceiver, a modem, a network card, a transmitter, a receiver, a microphone, a speaker, an antenna, a LED, a display device, or any other device configured to provide or receive information.

The flowcharts and diagrams in FIGS. 1-4 and 5A-5B illustrate examples of the architecture, functionality, and operation of possible implementations of systems, methods and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. Moreover, as used herein, the term "user" is intended to refer to one or more of a person, an organization, a computer, or any other entity, apparatus, device, or system.

For example, the terms "communication device," "communication system," "device," and "system" may generally refer to and include satellites 110, satellite links 115, operation hubs 130, devices or systems connected with clouds 140, devices 120, gateways 135, communication devices 150, or any other devices or systems that facilitate the communication of information. Moreover, the terms "management center," "management device," and "management system" may generally refer to and include satellites 110, satellite links 115, management center 130, devices or systems connected with clouds 140, devices 120, gateways 135, communication devices 150, or any other devices or systems that facilitate managing the communication of information. In addition, the term "satellite constellation" may refer to a single satellite or to a plurality of satellites.

While the techniques and implementations disclosed herein have generally been described in the context of satellite-based PTT communication, such techniques and implementations may readily be applied to other communication systems. For example, the techniques and implementations disclosed herein may be applied to cellular-based PTT communication systems, other terrestrial-based PTT communication systems, land mobile radio ("LMR") communication systems, hybrid communication systems using one or more of the communication systems described herein or apparent to one of skill in the art, or any other communication systems conceivable by one of skill in the art.

Aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to satellite communications, wireless, wireline, optical fiber cable, RF signals, etc., or any suitable combination of the foregoing.

Computer program code for carrying out operations for aspects of the present disclosure may be written in any combination of one or more programming languages, including an object oriented programming language, such as JAVA, C++, C#, or other suitable programming languages. The program code may execute entirely on a user's device, partly on a user's device, as a stand-alone software package, partly on a user's device and partly on a remote computer, or entirely on a remote computer or server. In the latter scenario, a remote computer may be connected to a user's device through any type of network, including a satellite communications network, a local area network ("LAN"), or a wide area network ("WAN"), or the connection may be made to an external computer (for example, through the Internet using an Internet Service Provider) or offered as a service, such as, for example, a Software as a Service ("SaaS"), e.g., over a secure web interface via a https connection.

Aspects of the present disclosure are described herein with reference to flowchart illustrations and/or block diagrams of methods, apparatuses (including systems), and computer program products. Individual blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer-readable medium. When accessed from the computer-readable medium and executed, the computer program instructions may direct a computer, other programmable data processing apparatus, or other devices to function in a particular manner, such that the instructions when stored in the computer-readable medium produce an article of manufacture including instructions that, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method comprising:
    receiving information specifying a geographic area for a talkgroup;
    receiving information specifying that the talkgroup is a "warm" talkgroup;
    in response to receiving the information specifying that the talkgroup is a "warm" talkgroup:
        determining that a first satellite of a satellite constellation is responsible for providing talkgroup coverage for the geographic area;
        in response to determining that the first satellite is responsible for providing talkgroup coverage for the geographic area, controlling the first satellite to continuously light up one or more control channels in the geographic area and to establish a direct and continuous connection, using the one or more control channels, with each communication device of a plurality of communication devices disposed in the geographic area;
        determining that the first satellite has moved to a new location such that the first satellite is no longer responsible for providing talkgroup coverage for the geographic area; and
        in response to determining that the first satellite has moved to the new location such that the first satellite is no longer responsible for providing talkgroup coverage for the geographic area:
            determining that a second satellite of the satellite constellation is responsible for providing talkgroup coverage for the geographic area;
            controlling the second satellite to continuously light up the one or more control channels in the geographic area; and
            controlling the first satellite to stop continuously lighting up the one or more control channels in the geographic area;
    receiving a request to instantiate the talkgroup via a control channel of the one or more control channels;
    in response to receiving the request to instantiate the talkgroup via the control channel, controlling the satellite constellation to continuously light up one or more traffic channels in the geographic area, the one or more traffic channels being traffic channels for the talkgroup;
    determining that the talkgroup is inactive; and
    in response to determining that the talkgroup is inactive, controlling the satellite constellation to stop continuously lighting up the one or more traffic channels in the geographic area while continuing to continuously light up the one or more control channels in the geographic area.

2. A method comprising:
    receiving information specifying a geographic area for a talkgroup;
    receiving information specifying that the talkgroup is a "warm" talkgroup;
    in response to receiving the information specifying that the talkgroup is a "warm" talkgroup, controlling a satellite constellation to continuously light up one or more control channels in the geographic area, the one or more control channels being control channels for the talkgroup;
    receiving a request to instantiate the talkgroup via a control channel of the one or more control channels;
    in response to receiving the request to instantiate the talkgroup via the control channel, controlling the satellite constellation to continuously light up one or more traffic channels in the geographic area, the one or more traffic channels being traffic channels for the talkgroup;
    determining that the talkgroup is inactive; and
    in response to determining that the talkgroup is inactive, controlling the satellite constellation to stop continuously lighting up the one or more traffic channels in the geographic area while continuing to continuously light up the one or more control channels in the geographic area.

3. The method of claim 2, wherein controlling the satellite constellation to continuously light up the one or more control channels in the geographic area comprises:
    determining that a first satellite of the satellite constellation is responsible for providing talkgroup coverage for the geographic area;
    in response to determining that the first satellite is responsible for providing talkgroup coverage for the geographic area, controlling the first satellite to continuously light up the one or more control channels in the geographic area;
    determining that the first satellite has moved to a new location such that the first satellite is no longer responsible for providing talkgroup coverage for the geographic area; and
    in response to determining that the first satellite has moved to the new location such that the first satellite is no longer responsible for providing talkgroup coverage for the geographic area:
        determining that a second satellite of the satellite constellation is responsible for providing talkgroup coverage for the geographic area;
        controlling the second satellite to continuously light up the one or more control channels in the geographic area; and
        controlling the first satellite to stop continuously lighting up the one or more control channels in the geographic area.

4. The method of claim 2, wherein controlling the satellite constellation to continuously light up the one or more control channels in the geographic area comprises:
    controlling the satellite constellation to continuously light up one or more control channels that are unique to the talkgroup, such that the one or more control channels do not provide information about any talkgroup other than the talkgroup.

5. The method of claim 2, wherein controlling the satellite constellation to continuously light up the one or more control channels in the geographic area comprises:
    controlling the satellite constellation to continuously light up one or more control channels that are shared by a plurality of talkgroups including the talkgroup, such that the one or more control channels provide information about one or more talkgroups other than the talkgroup.

6. The method of claim 2, wherein controlling the satellite constellation to continuously light up the one or more control channels in the geographic area comprises:

controlling a satellite of the satellite constellation to continuously light up one control channel in each beam provided by the satellite that covers the geographic area.

7. The method of claim 2, wherein controlling the satellite constellation to continuously light up the one or more control channels in the geographic area comprises:
controlling the satellite constellation to continuously light up at least one control channel in each beam provided by the satellite constellation that covers the geographic area, such that the one or more control channels are available to the entire geographic area while the satellite constellation continuously lights up the one or more control channels in the geographic area.

8. The method of claim 2, further comprising:
determining that the talkgroup is no longer a "warm" talkgroup; and
in response to determining that the talkgroup is no longer a "warm" talkgroup, controlling the satellite constellation to stop continuously lighting up the one or more control channels in the geographic area.

9. The method of claim 2, further comprising:
determining that the talkgroup has been inactive for at least a predetermined period of time;
in response to determining that the talkgroup has been inactive for at least the predetermined period of time, determining that the talkgroup is no longer a "warm" talkgroup;
in response to determining that the talkgroup is no longer a "warm" talkgroup, controlling the satellite constellation to stop continuously lighting up the one or more control channels in the geographic area.

10. The method of claim 2, wherein controlling the satellite constellation to continuously light up the one or more control channels in the geographic area comprises:
controlling the satellite constellation to establish a direct and continuous connection, using the one or more control channels, with each communication device of a plurality of communication devices disposed in the geographic area.

11. A system comprising:
a satellite constellation configured to provide communications for a talkgroup; and
a controller configured to control the satellite constellation,
wherein the controller is configured to:
receive information specifying a geographic area for the talkgroup;
receive information specifying that the talkgroup is a "warm" talkgroup;
in response to receiving the information specifying that the talkgroup is a "warm" talkgroup, control the satellite constellation to continuously light up one or more control channels in the geographic area, the one or more control channels being control channels for the talkgroup;
receive a request to instantiate the talkgroup via a control channel of the one or more control channels;
in response to receiving the request to instantiate the talkgroup via the control channel, control the satellite constellation to continuously light up one or more traffic channels in the geographic area, the one or more traffic channels being traffic channels for the talkgroup;
determine that the talkgroup is inactive; and
in response to determining that the talkgroup is inactive, control the satellite constellation to stop continuously lighting up the one or more traffic channels in the geographic area while continuing to continuously light up the one or more control channels in the geographic area.

12. The system of claim 11,
wherein the satellite constellation comprises:
a first satellite; and
a second satellite, and
wherein, when controlling the satellite constellation to continuously light up the one or more control channels in the geographic area, the controller is configured to:
determine that the first satellite is responsible for providing talkgroup coverage for the geographic area;
in response to determining that the first satellite is responsible for providing talkgroup coverage for the geographic area, control the first satellite to continuously light up the one or more control channels in the geographic area;
determine that the first satellite has moved to a new location such that the first satellite is no longer responsible for providing talkgroup coverage for the geographic area; and
in response to determining that the first satellite has moved to the new location such that the first satellite is no longer responsible for providing talkgroup coverage for the geographic area:
determine that the second satellite is responsible for providing talkgroup coverage for the geographic area;
control the second satellite to continuously light up the one or more control channels in the geographic area; and
control the first satellite to stop continuously lighting up the one or more control channels in the geographic area.

13. The system of claim 11, wherein, when controlling the satellite constellation to continuously light up the one or more control channels in the geographic area, the controller is configured to:
control the satellite constellation to continuously light up one or more control channels that are unique to the talkgroup, such that the one or more control channels do not provide information about any talkgroup other than the talkgroup.

14. The system of claim 11, wherein, when controlling the satellite constellation to continuously light up the one or more control channels in the geographic area, the controller is configured to:
control the satellite constellation to continuously light up one or more control channels that are shared by a plurality of talkgroups including the talkgroup, such that the one or more control channels provide information about one or more talkgroups other than the talkgroup.

15. The system of claim 11,
wherein the satellite constellation comprises:
a satellite configured to generate a plurality of beams, and
wherein, when controlling the satellite constellation to continuously light up the one or more control channels in the geographic area, the controller is configured to:
control the satellite to continuously light up one control channel in each beam of the plurality of beams provided by the satellite that covers the geographic area.

16. The system of claim 11,
wherein the satellite constellation is configured to generate a plurality of beams, and
wherein, when controlling the satellite constellation to continuously light up one or more control channels in the geographic area, the controller is configured to:
control the satellite constellation to continuously light up at least one control channel in each beam of the plurality of beams provided by the satellite constellation that covers the geographic area, such that the control channel is available to the entire geographic area while the satellite constellation continuously lights up the one or more control channels in the geographic area.

17. The system of claim 11, wherein the controller is further configured to:
determine that the talkgroup is no longer a "warm" talkgroup; and
in response to determining that the talkgroup is no longer a "warm" talkgroup, control the satellite constellation to stop continuously lighting up the one or more control channels in the geographic area.

18. The system of claim 11, wherein the controller is further configured to:
determine that the talkgroup has been inactive for at least a predetermined period of time;
in response to determining that the talkgroup has been inactive for at least the predetermined period of time, determine that the talkgroup is no longer a "warm" talkgroup;
in response to determining that the talkgroup is no longer a "warm" talkgroup, control the satellite constellation to stop continuously lighting up the one or more control channels in the geographic area.

19. The system of claim 11,
wherein the satellite constellation is configured to generate a plurality of beams including a plurality of carrier channels,
wherein, when controlling the satellite constellation to continuously light up the one or more traffic channels in the geographic area, the controller is configured to:
continuously light up one or more carrier channels of the plurality of carrier channels as the one or more traffic channels for the talkgroup, each of the one or more carrier channels corresponding to a respective one of the one or more traffic channels, and
wherein the controller is further configured to:
light up the one or more carrier channels as one or more traffic channels for another talkgroup while the one or more carrier channels are not being lit up as the one or more traffic channels for the talkgroup.

20. The system of claim 11, wherein the satellite constellation comprises a plurality of Low Earth Orbiting satellites.

\* \* \* \* \*